United States Patent

Ban

[15] 3,697,084

[45] Oct. 10, 1972

[54] PROGRAMMED TRACK SELECTING APPARATUS

[72] Inventor: Itsuki Ban, 829 Higashi-Oizumimachi, Tokyo-to, Japan

[22] Filed: Jan. 21, 1970

[21] Appl. No.: 4,601

[30] Foreign Application Priority Data

Jan. 22, 1969 Japan ........................44/4060

[52] U.S. Cl. ...274/4 F, 179/100.2 Z, 179/100.2 CA, 179/100.2 MD, 274/4 A

[51] Int. Cl. .........................G11b 23/06, G11b 23/08

[58] Field of Search......274/4 A, 4 B, 4 E, 4 F, 11 A, 274/11 B, 11 E, 9 RA; 179/100.2 Z, 100.2 CA, 100.2 MD; 353/15

[56] References Cited

UNITED STATES PATENTS

| | | | |
|---|---|---|---|
| 2,468,198 | 4/1949 | Heller | 274/4 A |
| 2,821,576 | 1/1958 | Gaubert | 274/11 E |
| 2,944,116 | 6/1960 | Vershoven | 179/100.2 MD |
| 3,109,898 | 11/1963 | Gray | 179/100.2 MD |
| 3,127,178 | 3/1964 | Osborne | 274/4 F |
| 3,140,360 | 7/1964 | Whitworth | 179/100.2 MD |
| 3,408,139 | 10/1968 | Schwartz | 274/4 F |

*Primary Examiner*—Leonard Forman
*Assistant Examiner*—Dennis A. Dearing
*Attorney*—Jacobs & Jacobs

[57] ABSTRACT

A programmed track selecting apparatus for a multiple tape cartridge player utilizing a plurality of multi track endless magnetic tape cartridges, has a plurality of track selecting switches for designating a desired track to be played mounted below an assignment plate that rotates at a rotational speed less than that of the container carrying the cartridges. The assignment plate carries a plurality of pushbutton rods associated with each cartridge operable when manually depressed to actuate the track selecting switch. The track selecting switches cooperate with a rotary switch having a second set of switches corresponding to the track selecting switches, the rotary switch being rotated in synchronism with the container and operable to actuate a rotary cam to move the magnetic head across the tracks on the tape to the desired track.

3 Claims, 8 Drawing Figures

PROGRAMMED TRACK SELECTING APPARATUS

BACKGROUND OF THE INVENTION

The present invention relates to a multiple tape cartridge player utilizing a plurality of magnetic track endless magnetic tape cartridges, and more particularly to a programmed track selecting apparatus which is capable of automatically selecting and reproducing the preselected track in relation to the individual cartridge to be played.

A multi track or multi channel endless magnetic tape cartridge player normally includes a track changing device which is shifted to allow the magnetic head to be synchronized with the tracks on the tape thereby scanning across the tape. One type of the track changing devices of the class above described includes a shifting mechanism in which a conductive patch as endmark on the tape passes over an endmark detector having a pair of insulated feeler contacts which are shorted by the conductive patch and in response to passage of the patch over the endmark detector the magnetic head is successively moved to the position suitable for the tracks on the tape thereby successivel reproducing each record track on the tape. On the other hand, the multiple endless tape cartridge player includes a cartridge changing device in addition to the above mentioned track changing device to engage the cartridge in play mode. In other words, according to those multiple cartridge player, all the record tracks in the cartridge engaged in play mode are continuously played. However, it is not desirable for the user to reproduce all the tracks on the tape. Preferably, the track as desired may be reproduced for the convenience of the user. It is also desirable for the user that the cartridge to be played is predesignated to automatically select and reproduce the designated cartridge.

SUMMARY OF THE INVENTION

It is a primary object of the present invention to provide a programmed track selecting apparatus for a multiple tape cartridge player utilizing a plurality of multi track endless magnetic tape cartridge, which is capable of predesignating the track to be reproduced in relation to the individual cartridge and automatically selecting, reproducing the designated track in relation to the cartridge engaged in play mode.

Another object of the invention is to provide a programmed track selecting apparatus for a multiple tape cartridge player utilizing a plurality of multi track endless magnetic tape cartridges, wherein exchange of the cartridge to be played may be made in response to completion of reproduction of the designated track with respect to the cartridge engaged in play mode.

A further object of the invention is to provide a programmed track selecting apparatus for a multiple tape cartridge player utilizing a plurality of multi track endless magnetic tape cartridges, wherein by provision of a rotary switch having track selecting switches provided corresponding to the individual track on the tape and switches corresponding to the individual track selecting switches, the shifting device moving the magnetic head to the position suitable for the track on the tape is controlled.

Still further object of the invention is to provide a programmed track selecting apparatus for a multiple tape cartridge player, wherein the track selecting switches are actuated by assignment means provided corresponding to the individual cartridge and for designating the track to be reproduced and the designated track is properly reproduced by assignment means whenever the cartridge engaged in play mode is changed.

Yet another object of the invention is to provide a programmed track selecting apparatus for a multiple tape cartridge player utilizing a plurality of multi track endless magnetic tape cartridges, wherein the track to be reproduced in relation to the individual cartridge can be designated and the cartridge to be played can also be.

For a better understanding of the invention, reference is made to the following detailed description of the preferred embodiments taken in conjunction with the accompanying drawings in which:

DESCRIPTION OF THE PREFERRED EMBODIMENTS

Figure 1:
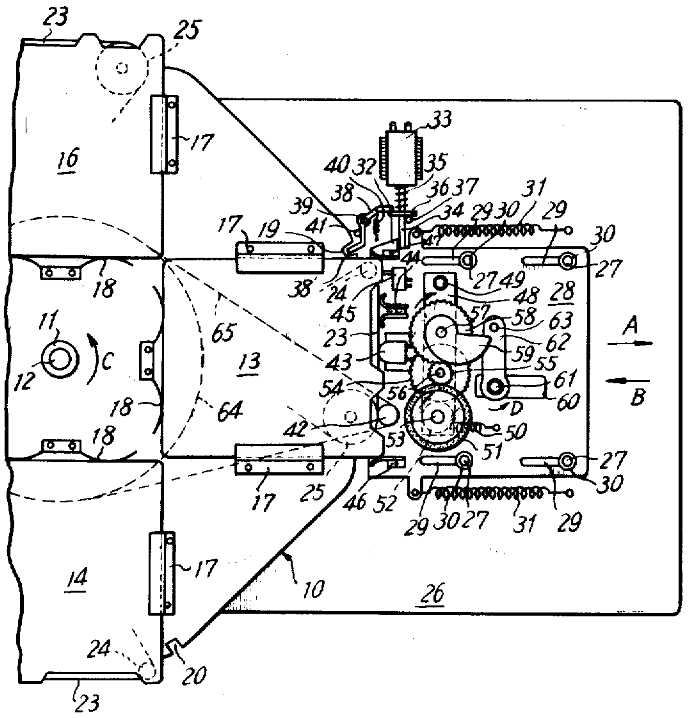
FIG. 1 is a plan view of a multiple tape cartridge partially broken away.

The example of magnetic tape playing apparatus utilizing plurality of endless magnetic tape cartridges shown in FIG. 1 includes a flat and rotary container 10 to which a plurality of cartridges are horizontally and radially mounted. The container 10 shown as being partially broken away in FIG. 1 is substantially octagonal and is rotatably supported by a sleeve 11 over an axis mounted to a bottom plate of a player housing (not shown) at the center of the container. The container 10 is adapted to receive four endless magnetic tape cartridges 13 to 16 (15 is on the broken part). Guide means 17 are suitably provided on the container 10 to receive the cartridges and these guide means 17 may comprise parallel spaced rails secured in upright extension to the container. The separation of the two portions of the guide means 17 is just sufficient to accommodate a tape cartridge in sliding relation between the guide means so that no possible canting or other undesirable motion of the cartridge is possible when same is inserted between the guide means upon the container 10. The cartridges 13 to 16 inserted between the guide means 17 each include a rear edge which abuts against a leaf spring 18 secured at the center thereof to the container 10. As shown, each cartridge is inserted in a manner that the leading edge thereof is projected from the periphery of the container. The container 10 is provided at the periphery thereof with four notches 19 to 22 (21, 22 are not shown) operation of which will be described later. The cartridges 13 to 16 each include a generally rectangular housing with a centrally disposed reel assembly (not shown) on which a magnetic tape 23 is wound and unwound in conventional manner. The endless tape 23 passes over a guide 24 and a pinch roller 25. The guides 24 and pinch roller 25 are disposed adjacent the leading edge of the cartridge whereat the cartridge side wall is cut away or disposed with and the tape 23 is extended from the center of the hub of the reel (not shown) about the guide 24 and thence about the pinch roller 25 back to the outer periphery of a roll formed by the tape wound about the hub.

Numeral 26 designate a base plate which is horizontally mounted in the player housing (not shown) and on which four vertical aligning rods 27 are mounted. The rod 27 is shown to be tapered to the uppermost end thereof. A reciprocating deck 28 is slidably supported and includes elongated slots 29 to receive each of the rods 27. Rings 30 are mounted on the respective rods 27 at each end thereof to prevent the deck 28 from being out of the rods and going upwardly and downwardly over the rods. The deck 28 is parallel to the base plate 26 and disposed to provide a space between the deck and the base plate 26. The deck 28 is given a movable force in the direction of arrow A by means of springs 31. FIG. 1 shows a situation where a hook portion 32 is engaged by an actuator 34 for an electromagnetic plunger 33 firmly mounted to the base plate 26 to hold the deck 28 in position against the bias of the springs 31. The actuator 34 for the plunger 33 is projected by the bias of a spring 35 to such a position, when the plunger is not energized, where a flange 36 on the actuator abuts against a stopper pin 37 on the base plate 26. A latch lever 38 has one end in engagement relationship with the flange 36 on the actuator and the other end interposed within one of the notches 19 to 22 and it is pivotally mounted by a pin 39 to the base plate 26. The latch lever 38 is given a clockwise rotational force by a spring 40, however, rotation of the latch lever 38 is limited by a stopper pin 41 on the base plate 26. As seen from FIG. 1, the end 38′ of the latch lever 38 is interposed in the notch 19 to rotation of the container 10 while the cartridge 13 is held in the playing position. There are mounted on the deck 28 reproducing members for the cartridge in the playing position, such as a capstan 42, a magnetic head 43, and an end-mark detection or sensing means 44. The capstan 42 passes through a hole (not shown) in the deck 28 and upwardly extends from the deck 28. The capstan 42 is downwardly of the deck connected to a driving mechanism (not shown) including a motor (not shown) provided beneath the deck. Mounted on the deck 28 is an electrical switch 45 which, as will be described in detail later, is actuated by the front edge of the cartridge. Guides 46, 47 are also provided on the deck 28 to control the cartridge with respect to the deck 28 when the cartridge is held in the playing position.

A driving means for moving the deck 28 against the elastic force of the tension springs 31 includes a swing lever 48 swingably mounted on a shaft 49 on the deck 28. The swing lever 48 is urged in the counterclockwise direction by a spring 50. A rubber covered frictional wheel 51 and a gear 52 connected to each other are rotatably supported on an axis 53 on the swing lever 48. The frictional wheel 51 as will be described later is caused to abut against the capstan 42 by rotation of the swing lever 48 from the position as shown to the clockwise direction and is rotatably driven by the capstan. Integrally formed gear 54 and 55 are rotatably supported on an axis 56 on the swing lever 48. The gear 54 is adapted to mesh with the gear 52. Rotatably mounted on an axis 57 on the swing lever 48 are a gear 58 and a cam 59 which are connected with each other, with gear 58 meshing with the gear 55. The gears 52, 54, 55 and 58 constitute a reduction gearing and rotation of the frictional wheel 51 is reduced to be imparted to the cam 59.

A lever 62 is swingably mounted to a shaft 61 which is projected from the base plate 26 and upwardly extends through an opening 60 in the deck 28. As will be detailed later, a pin 63 is provided on the lever 62 to abut against the cam 59. The lever 62 is urged round the shaft 61 in the direction of arrow D by an actuable spring (not shown), however, rotation of the lever 62 due to the spring (not shown) is arrested by a stopper member (not shown) and then is held in a position as shown.

Means for rotatably driving the container 10 includes a pulley 64 mounted to the sleeve 12 common to the container, and a belt 65 interposed between the pulley 64 and the capstan 42. The belt 65 is adapted to be slackened when the deck 28 in the position as shown, and is slipped over the pulley 64 and the capstan 42. As will be mentioned in detail later, when the deck 28 is moved from the position as shown to the direction of arrow A by the bias of the springs 31, the belt 65 is tensioned to impart a rotational force of the capstan 42 to the container 10 through the belt, the pulley 64, and the sleeve 11 to provide a rotational force in the direction of arrow C for the container.

Figure 2:
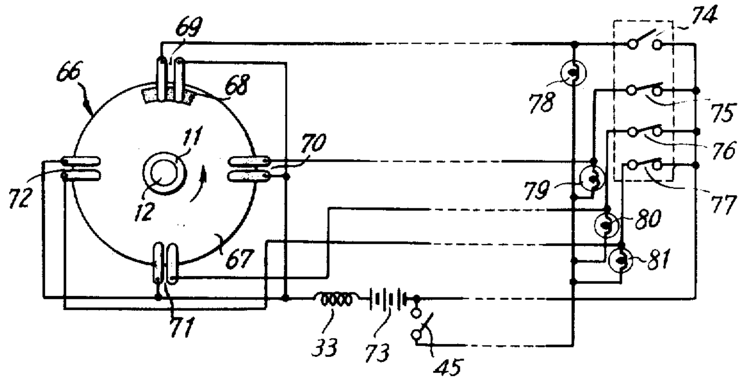
FIG. 2 is an electrical circuit for controlling rotation of the container shown in FIG. 1 and the current supply to the electromagnetic plunger.

FIG. 2 shows a control means for controlling not only supply of current of the electromagnetic plunger 33 but also retention of the deck 28 and for controlling rotation of the container 10 to locate the cartridge to be played in the playing position. In the drawing, similar numerals are used to illustrate like parts in FIG. 1.

The control means includes a rotary switching means 66. The rotary switching means 66 has insulation rotary disk 67 tightly mounted on the sleeve 11 with the container 10 and the pulley 64 (FIG. 1). A conductive piece 68 is provided to the rotary disk 67 at the upper surface thereof. Switches 69 to 72 each consisting of a pair of contacts are mounted on a fixed member (not shown) of insulation, which is provided corresponding to the rotary disk 67. The switches 69 to 70 are spaced 90° apart from another and successively closed by the conductive piece 68 due to rotation of the rotary disk 67 as the sleeve 11 is rotated. The contacts on one hand with respect to the switches 69 to 72 are connected through the electromagnetic plunger 33 with the plus terminal of an electrical source 73 and the other contacts are respectively connected through cartridge selecting switches 74 to 77 provided corresponding to the cartridges 13 to 16 (FIG. 1) with the minus terminal of the source 73. The cartridge selecting switches 74 to 77 are provided for designating the cartridge to be played within the container 10 and they are so adapted that when one is manually operated to be opened, the remainder are closed. Indicator lamps 78 to 81 are connected through the electrical switch 45, as shown, in parallel with associated cartridge selecting switches 74 to 77. It will be understood from the following description how the indicator lamps 78 to 81 functions. The switch 45 is adapted to open or close when the cartridge is actuated or deactuated.

A mode of operation and function of the tape player shown in FIGS. 1 and 2 will be described in detail hereinafter. FIG. 1 as in FIG. 2 shows a situation where the cartridge 13 designated by the cartridge selecting switch 74 is held in the playing position and is then played. That is, the capstan 42 on the deck 28 abuts against the pinch roller 25 over the tape 23 in the cartridge to drivingly transport the tape with the magnetic head 43 on the deck 28 being slidably in contact with the tape 23. Abutment force between the capstan 42 and the pinch roller 25 is provided by the leaf spring 18 on the container 10 biasedly urging the rear edge of the cartridge 13. A relative position of the cartridge 13 with respect to the capstan 42 and the magnetic head 43 is constantly maintained by the guides 46 and 47 on the deck 28. The rotary disk 67 for the rotary switch 66 is in a position where the conductive piece 68 on the disk shorts contacts of the switch 67 when the cartridge 13 is held in the playing position. Even if the switch 69 is closed, the plunger 33 is not energized by the electrical source 73 since the cartridge selecting switch 74 has been opened. On the other hand, the indicator lamp 78 is not lit since the switch 45 has been actuated and opened by the cartridge 13.

Now the cartridge 16 is desired to be played instead of the cartridge 13, the cartridge selecting switch 77 is manually operated and opened. Upon opening the cartridge selecting switch 77, the cartridge selecting switch 74 is also opened so that a heavy current from the electrical source 73 is applied through the switch 69 of the rotary switch 66 and the switch 74 to the exciting coil of the plunger 33. Accordingly, the actuator 34 for the plunger 33 is attracted against the bias of the spring, and the actuator is at one end thereof disengaged from the hook portion 32 of the deck 28 to release retention of the deck 28 while the latch lever 38 which is at one end thereof engaged by the flange 36 on the actuator 34 is counterclockwise rotated against the bias of the spring to allow the end 38' to escape from the notch 19 of the container 10 thus releasing retention of the container 10. The deck 28 which has been released from the plunger 33 is moved from a position as shown to the direction of arrow A by the bias of the tension spring 31 to admit the minimum deformed portion of the cam 59 to abut against the pin 63 on the lever 62. With respect to movement of the deck 28 to the direction of arrow A, the guides 46 and 47 are away from the cartridge 13 and the capstan 42, magnetic head 43, endmark detector 44, and the switch 45 are also away therefrom. As a result, the cartridge is caused to suspend its play. Movement of the deck 28 to the direction of arrow A tensions the belt 65 which has been loosed, and rotation of the capstan 42 is imparted through the belt to the pulley 64 to initiate rotation of the container 10, in the direction of arrow C. Upon rotation of the container 10, the rotary disk is rotated in the direction of arrow as shown and the switch 69 which has been closed by the conductive piece 68 is opened to deenergize the plunger 33.

By engagement of the capstan 42 with the frictional wheel 51, the latter is rotated and rotation thereof is transmitted through the gearing 52, 54, 55 and 58 to the cam 59 to rotate the same in the direction of arrow as shown. Initially, the minimum deformed portion of the cam 59 abuts against the pin 63 on the lever 62, and the portion which engages the pin 63 would be the maximum deformed portion as the cam is further rotated. With further rotation of the cam 59, the deck 28 is gradually moved to the direction of arrow B against the bias of the springs 31.

During movement of the deck 28 in the direction of arrow B, the container 10 is rotated in the direction of arrow C and makes rotation of 90° from the position as shown so that the cartridge 14 is moved to the playing position whereby the end 38' of the latch lever 38 is opposed to the notch 20 but not interposed in the notch 20 since the switch 70 is closed by the conductive piece 68 on the rotary disk 67 which is rotated synchronously with the container 10 while the cartridge selecting switch 75 has been closed. Accordingly, the container 10 is further rotated and the switch 70 is caused to be opened to deenergize the plunger 33. The container 10 makes rotation of 180° and thus the cartridge 15 (on the broken part in FIG. 1) is moved to the playing position. And, as a result that the switch 71 is closed by the conductive piece 68 on the disk 67 and the cartridge selecting switch 76 has been closed, the plunger 33 is again energized to continue rotation of the container 10 without being prevented form its rotation by the latch lever 38. When the container 10 makes rotation of 270°, the cartridge 16 is moved to the playing position and the switch 72 is closed by the conductive piece 68 on the rotary disk 67. Although the switch 72 has been closed, the plunger 33 is not energized since the cartridge selecting switch 77 has been opened. Therefore, the end 38' of the latch lever 38 is interposed in the notch 22 (on the broken part in FIG. 1) to arrest rotation of the container 10 and by operation of the cartridge selecting switch 77 the cartridge 16 which is designated to be played is brought to the playing position. Positioning of the cartridge 16 in the playing position is indicated by the indicator lamp 81 to which the current is applied from the electrical source 73 via the switch 72, the exciting coil of the plunger 33, and the switch 45, and which is lit. Since the indicator lamps 78 to 81 are each of high electrical resistance, the current applied from the electrical source 73 to the plunger 33, when the indicator lamp 81 is lit, is too small to actuate the plunger. As a result, the plunger 33 is maintained in non-operative condition.

After the container 10 is suspended from its rotation, the deck 28 has been moved to the direction of arrow B as rotation of the cam 59. When the cam 59 makes approximately one rotation, the deck 28 is moved to the position as shown and the front edge of the cartridge 16 is clamped at the corners thereof between the guides 46, 47 so that a relative position of the cartridge 16 in relation to the deck 28 is in order while the hook portion 32 of the deck engages the actuator 34 of the plunger 33. The cam 59 is rotated to the extent that the maximum deformed portion is away from the pin 63 on the lever 48 to release the cam from the pin 63 terminating movement of the deck 28 in the direction of arrow B at the same time the deck is anchored in the position as shown by the actuator 34 of the plunger 33. Engagement of the cam 59 with the pin 63 on the lever 62 is released with the swing lever 48 being returned to its original position by the bias of the spring 50 to release the frictional wheel 51 from the capstan 42 whereby the cam 59 is suspended from its rotation at the position as shown. Movement of the deck 28 in the direction of arrow B thus allowing the same to be returned to its original position causes the cartridge 16 is not received within the container 10, the switch 45 is not actuated and maintained in closed position with the indicator lamp 81 light on it is determined that the cartridge corresponding to the cartridge selecting switch 77 is not received in the container 10.

As is clear from the foregoing description, by operation of the cartridge selecting switch 77 the cartridge 16 corresponding to the switch is automatically moved to in the playing position and thus played.

It will be readily understood that if the cartridge selecting switch 75 is operated the cartridge 14 in place of the cartridge 16 will be in the playing position and thus played in the same manner as in the foregoing. It follows that the cartridge received in the container 10 is selected, as desired, to be played. The period for which the deck 28 is moved to the direction of arrow B by the cam 59 is required, of course, to be longer that for which the designated cartridge is located by rotation of the container 10 in the playing position.

Figure 3:
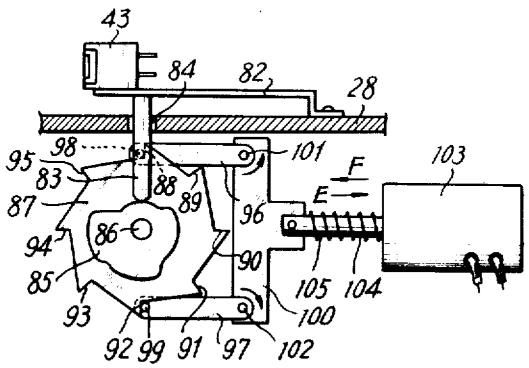
FIG. 3 is a schematic representation explanatory of the shifting device for moving the magnetic head in FIG. 1 to the position suitable for the record track on the magnetic tape.

FIG. 3 shows a mechanism, not shown in FIG. 1 for the purpose of simplicity thereof, which moves the magnetic head 43 (FIG. 1) to a plurality of different predetermined fixed points across the width of the tape 23 within the cartridge and then changes over the record tracks to be reproduced on the tape 23. In the drawing, similar numerals are used to illustrate like parts in FIG. 1. The magnetic head 43 is firmly secured to support plate or leaf spring 82 which one end portion is fixed on the reciprocating deck 28. Rigidly mounted to the leaf spring 32 at the under side thereof is a pin 83 which passes through an opening 84 and extends downwardly of the deck 28, the rounded bottom end of the pin is arranged to ride on a rotary cam 85 on a shaft 86. The leaf spring 82 is given the downward elastic force to maintain the pin 83 and cam 85 is in a operative relation. The shaft 86 is rotatably provided by a bearing (not shown) mounted to the deck 28 at the under side thereof. A ratchet wheel 87 is firmly mounted to the shaft 86. The cam 85 is adapted to be rotated when the ratchet wheel as will be described in detail later is drivingly rotated. Rotation of the cam allows the leaf spring 82 is swung by the pin 83 to move the magnetic head 43. The cam 85 is arranged to encounter itself four stages when moved up and down. Accordingly, the magnetic head 43 is allowed to be moved to a position suitable for four record-tracks (8 tracks in case of stereo).

The ratchet wheel 87 includes eight gear teeth 88 to 95. Reciprocating levers 96, 97 are provided in relation to the ratchet wheel 87 and pins 98, 99 mounted on the levers 96, 97 mesh with the two teeth. The reciprocating levers 96, 97 are pivotally mounted on a lever 100 by pins 101, 102 in turn provided on end portion of the lever 100 and urged by springs (not shown) in the direction of the arrows. The lever 100 is connected to an actuator 104 of an electromagnetic plunger 103 fixed by a bracket (not shown) to the deck 28 at the under side thereof. Energization of the plunger 103 allows the actuator 104 to be attracted in the direction of arrow E against the bias of a compressive spring 105 and to be moved accordingly. With movement of the actuator 104, the levers 96, 97 are caused to be moved and the pin 98 which is on the lever 96 engages the tooth 88 to rotate the ratchet wheel 87 by one tooth in the clockwise direction. At this time, the pin 99 on the lever 97 is brought to such the state in which it is engaged by the tooth 96 since the pin 99 is caused to pass over the teeth 91, 90 by rotation of the ratchet wheel 87 and movement of the lever 97. When the plunger 103 is deenergized, the actuator 104 and the levers 96, 97 are movably restored by the bias of the compressive spring 105 in the direction of arrow F to thus allow the pin 99 on the lever 97 to depress the tooth 90 to rotate the ratchet wheel 87 in the clockwise direction by one tooth. Assuming that the actuator 104 is fully returned to its original position, the pin 98 engages the tooth 94 of the ratchet wheel 87. That is, the ratchet wheel 87 is rotated in the clockwise direction by two teeth, namely, 90° whenever the plunger 103 is energized.

Figure 4:
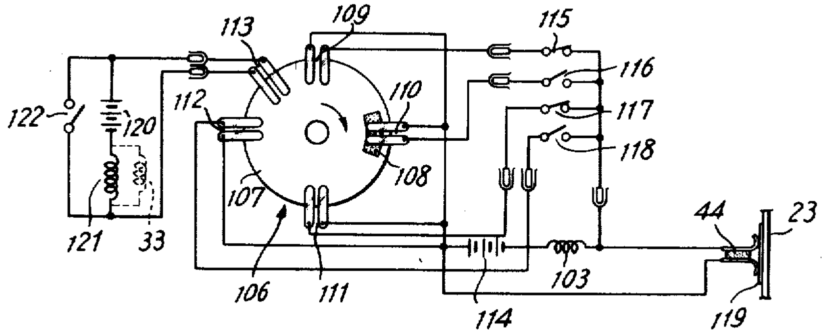
FIG. 4 is an electric circuit diagram for a programmed track selecting apparatus according to the present invention.

Referring to FIG. 4, means are shown for controlling rotation of the cam 85 by controlling the current supply to the plunger 103. In the drawing, similar numerals are used to illustrate like part in FIG. 1 and 3.

Numeral 106 is a rotary switching means which is operated by the shaft 86 and having a rotary disk, of insulation, fixed to the shaft 86. A conductive piece 108 is mounted to the surface of the rotary disk 107. Switches 109 to 113 each consisting of a pairs of contacts are mounted to a fixed member (not shown) of insulation, which is provided corresponding to the rotary disk 107. The switches 109 to 112 are spaced away to form an angle of 90° to one another and the switch 113 is provided between the switches 112 and 109. In series, running from plus terminal of an electrical source 114 to minus terminal of the source, are the switch 109, normally-opened track selecting switch 115 and the plunger 103. In series, running from plus terminal of the source 114 to minus terminal of the source, are the switch 110, normally-opened track selecting switch 116 and the plunger 103. In series, running from plus terminal of the source 114 to minus terminal of the source, are the switch 111, normally-opened track selecting switch 117 and the plunger 103. In series, running from plus terminal of the source 114 to minus terminal of the source, are the endmark detector 44 on the deck 28 (FIG. 1) and the plunger 103. The endmark detector 44 consists of two feeler contacts that are shorted by a conductive patch 119 provided on the endless magnetic tape 23 within the cartridge and number of insulation for supporting the contacts. In series, running from plus terminal of an electrical source 120 to minus terminal of the source, are the switch 113 and an electrical plunger 121. An electrical switch 122 is connected in parallel with the plunger 121 and the source 120. Operation of the plunger 121 and the switch 122 will be described in detail later. In FIG. 4, the track selecting switches 116, 118 are opened and the second and fourth record-tracks are designated while the second track is reproduced. When the two feeler contacts of the endmark detector 44 is shorted by the conductive patch 119 on the tape 23 upon completion of reproduction of the second track, the plunger 103 is energized by the source 114 to rotate the shaft 86 by 90° in the direction of the arrow. As the shaft 86 is rotated, the rotary disk 107 is rotated to a position where the switch 111 is closed by the conductive piece 108. Thus, the plunger 103 is energized from the source 114 via the track selecting switch 117, the switch 111 to rotate the shaft 86 by 90° in the direction of the arrow. Due to rotation of the shaft 86, the rotary disk 107 is rotated to a position where the switch 112 is closed by the conductive piece 108. In spite of closing of the switch 112, the plunger 103 is not caused to be energized not to rotate the shaft 86 since the track selecting switch 118 has been opened. Thus, the fourth track on the tape 28 corresponding to the selecting switch 118 begins its reproduction. When the connection between the two feeler contacts of the endmark detector 44 is shorted by the conductive patch 119 on the tape 23 after the fourth track completes its reproduction, the plunger 103 is energized from the source 114 to rotate the rotary disk 107 by 90°. With rotation of the rotary disk 107, the conductive piece 108 is away from the switch 112 and is shifted to a position where the switch 109 is closed. In the course of this shifting of the conductive piece 108, the switch 113 is closed by the conductive piece. When the switch 113 is closed, the plunger 121 operation of which will be detailed later, is energized later.

From the foregoing description it will be understood that the record tracks on the tape 23 is properly designated by the track selecting switches 115 to 118 and is thereby reproduced. Further, it will be also understood that by the control device in FIG. 2 and the control device in FIG. 4 the cartridges to be played and the record tracks to be reproduced may be selected. As shown by the dotted line in FIG. 4, the electrical plunger 33 (FIG. 1) is provided in parallel with the plunger 121, and selection of the cartridge to be played by a control system in FIGS. 5 and 6 as will be detailed later. With this arrangement, the control device in FIG. 2 in not required.

Figure 5:
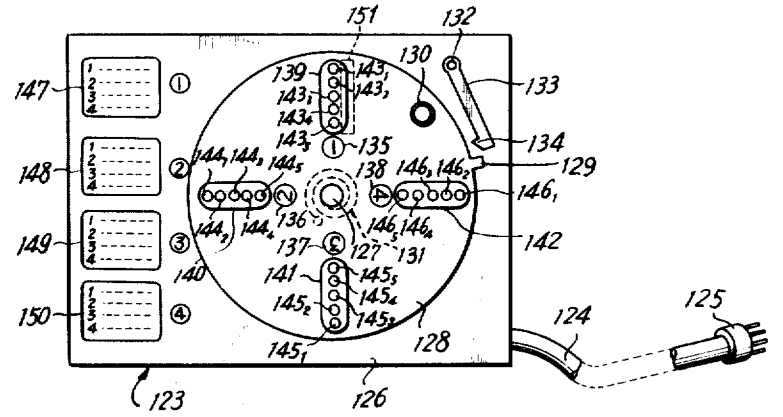
FIG. 5 is a plan view of a control system for controlling operation of the switches in FIG. 4 and for designating the record track to be reproduced in the individual cartridge.
Figure 6:
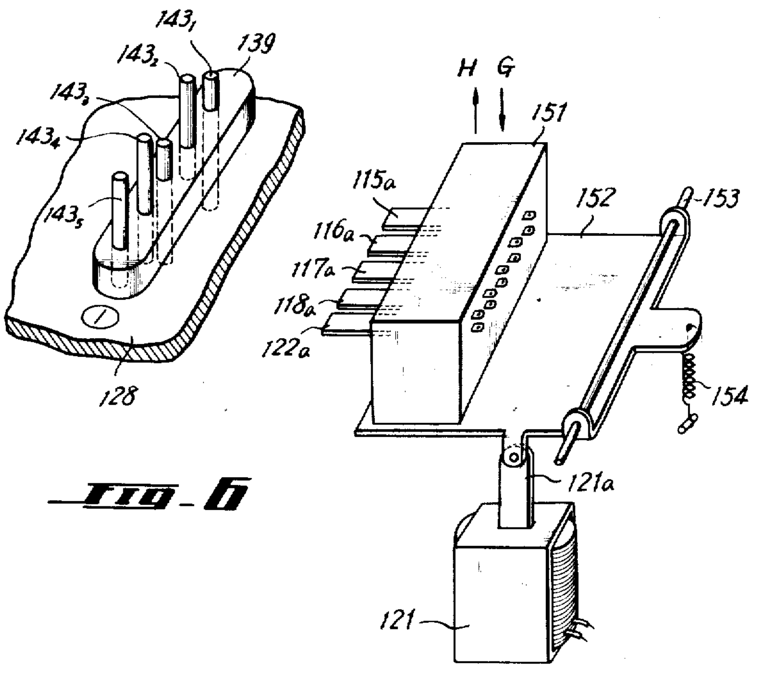
FIG. 6 is a perspective view showing a relationship between the switch block mounted in the control box in FIG. 5 and pushbutton rods mounted to an assignment plate.

FIGS. 5 and 6 show a control system for designating the cartridge to be played and the record track to be reproduced, wherein numeral 123 indicates a control box which contains the track selecting switches 115 to 118, the source 120, the plunger 121, and the switch 122 as shown in FIG. 4. The track selecting switches 115 to 118, the source 120, the plunger 121, and the switch 122 received within the box 123 are individually connected through a cord 124 and a connector 122 to switches 109 to 113 of the rotary switch 106 to form a circuit shown in FIG. 4. The plunger 33 (FIGS. 1 and 4) is also connected through the connector 125 in parallel with the plunger 121 within the box 123. An assignment plate 128 is rotatably mounted to a shaft 127 mounted to a bottom plate (not shown) of the box 123. The assignment plate 128 is disposed above a panel 126 of the box 123 and an opening (not shown) is formed on the panel 126 at a portion facing the assignment plate and is of the same dimension as the plate. The assignment plate 128 includes a protruding part 129 at the periphery thereof and a knob 130 at the surface thereof. The assignment plate 128 is given a rotational force in the direction of the arrow as shown by a coil spring 131 as indicated by the dotted line. A latch lever 133 is provided outwardly of the plate 128 and is given a rotational force in the direction of arrow as shown by a spring (not shown). As shown, the latch lever 133 is pivotally mounted by a point 132 on the panel 126 and includes a pawl portion 134 which serves to engages the protruding part 129 of the assignment plate 128 to arrest rotation thereof. Energy is stored in the coil spring 131 by manually rotating the assignment plate 128 in the counterclockwise direction by means of the knob 130. In case of counterclockwise rotation of the assignment plate 128, the latch lever 133 is caused to be depressed by the protruding part 129 and swung to a position not to arrest rotation of the plate 128. A governor (not shown) is provided so that rotation of the assignment plate 128 is controlled in a manner that the plate 128 is rotated at a rotational speed less than the container 10 shown in FIG. 1. Formed on the assignment plate 128 are four indicators 135 to 138 which correspond to the cartridges 13 to 16 (FIG. 1), respectively and which are indicated by digits 1, 2, 3, and 4. Support elements 139 to 142 are radially disposed on the plate 128 to correspond to the indicators 135 to 138 and each include five slidable pushbutton rods $143_1$ to $143_5$, $144_1$ to $144_5$, $145_1$ to $145_5$, $146_1$ to $146_5$. These rods are cylindrical and are received in cylindrical hole (not shown) bored through each of the support elements. The pushbutton rods are adapted to be extended from the plate 28 at the under side thereof at a certain length of the rod and are engaged under the frictional force. Labels 147 to 150 are provided on the panel 126 to show the record composition or content for the cartridge whereby it is convenient to select the cartridge and record-track.

A switch block 151 in FIG. 5 is shown to contain the track selecting switches 115 to 118 and the switch 122, as shown by the dotted line therein.

FIG. 6 shows an enlarged view of the switch block 151 and the pushbutton rods $143_1$ to $143_5$. As seen from the drawing, actuators $115_a$, $116_a$, $117_a$, $118_a$, and $122_a$ for the respective track selecting switches 115 to 118 and the switch 122 are provided to project from the switch block 151 at one side thereof. The switch block 151 is mounted to a swing plate 152 swingably supported on a shaft 153 mounted in the box 123. The swing plate 152 is clockwise urged by a spring and is prevented from being further rotated by a stopper member (not shown) as in the state shown in FIG. 6. The swing plate 152 is connected to the actuator $121_a$ of the plunger 121 and is adapted to be swung in the direction of arrow G when the plunger 121 is energized. This swing plate is returned by the bias of the spring 154 to its original position in the direction of arrow H when the plunger 121 is deenergized. FIG. 6 shows the pushbutton rods $143_1$ and $143_3$ in the depressive position so that the second track and the fourth track in the cartridge (the cartridge 13 in FIG. 1) corresponding to the indicator 135 is designated to be reproduced. In other words, the pushbutton rod is depressed corresponding to the record-track undesired to be reproduced. Designation of the cartridge to be played and the record-track to be reproduced is made by operation of the pushbutton rod when the protruding part 129 of the assignment plate 128 engages the pawl portion 134 of the latch lever 133 to arrest rotation of the plate 128. At this point, the latch lever 133 is manually and counterclockwise rotated to a position where it releases retention of the assignment plate 128 thereby rotating the plate 128 in the direction of the arrow as shown. This rotation of the assignment plate 128 is arrested by the pushbutton rods $143_1$ and $143_3$ when engaged by the actuators $115_a$ and $117_a$, as shown in FIG. 6. The pushbutton rods $143_1$ and $143_3$ depressed into engagement of actuators $115_a$, $117_a$ thus allowing the latter to be urged to close the track selecting switches 115 and 117. Upon closing of the track selecting switches 115 and 117, it is apparent from FIG. 4 that the cartridge corresponding to the indicator 135 is automatically selected and reproduced with the second track and the fourth track being selected and reproduced. Completion of reproduction of the fourth track energize the plunger 103 (FIGS. 3 and 4) to rotate the rotary disk 107 (FIG. 4). At this moment, the switch 113 is closed so that the plunger 121 is energized to swing the swing plate 152 in the direction of arrow G. Upon swingable movement of the swing lever 152, the actuators $115_a$, $117_a$ are caused to be away from engagement position with the pushbutton rods $143_1$, $143_3$ to rotate the assignment plate 128 in the direction of the arrow as shown. Since the switch 113 is closed in pulse fashion by the conductive piece 108 to thus deenergize the plunger 121 immediately whereby the swing plate 152 is returned to the position as shown. At the time when the plunger 121 is energized, the plunger 33 (FIGS. 1 and 4) is also energized in pulse fashion. This results in that the container 10 (FIG. 1) is rotated of 90° to bring the next cartridge (cartridge 14 in FIG. 1) to the playing position. With respect to swingable movement of the swing plate 152, the assignment plate 128 which has been released from retention and thus rotated in the direction of the arrow as shown, is again retained at a position where the operatively depressed pushbutton rod corresponding to the indicator 136 engages the actuators $115_a$ to $118_a$, and $122_a$. Prior to retention of the assignment plate 128, the container 10 has been retained at a position where the cartridge 14 is held in the playing position. If the pushbutton rod $144_5$ out of the pushbutton rods 144 corresponding to the indicator 136, the actuator $122_a$ is depressed to close the switch 122. Closing of the switch 122 energizes the plungers 121 and 33 so that the swing plate 152 is swingably driven to release the assignment plate 128 for rotation thereof whereby the container 10 is rotated to hold the next cartridge in the playing position. Accordingly, the cartridge corresponding to the indicator 136 is not played and it carried to the non-playing position. From the foregoing description, the pushbutton rods corresponding to the actuators $115_a$ to $118_a$ for the track selecting switches 115 to 118 may be properly depressed to designate the record track to be reproduced and select, reproduce the designated record track while the pushbutton for the actuator $122_a$ is suitably depressed, operated to designate the cartridge to be played and to select, play the designated cartridge. The operated and depressed pushbutton rods are manually drawn and returned to their original positions.

Figure 7:
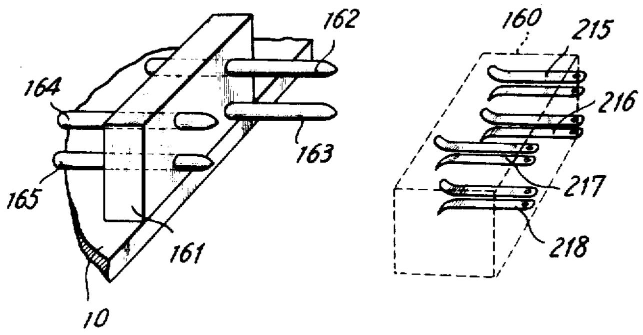
FIG. 7 is a schematic representation explanatory of another designator means for designating the record track to be reproduced.

FIG. 7 shows alternative means for designating the record track to be reproduced, in which numeral 160 is a switch block mounted to the reciprocating deck 28 (FIG. 1). The switch block 160 includes track selecting switches 215 to 218 similar to the those in FIG. 4. The track selecting switches 215 to 218 include a pair of individually insulated and spaced parallel contacts. Numeral 161 is a support element which is secured to the container 10 (FIG. 1) at the periphery thereof and to which slidable pushbutton rods 162 to 165 of conductive metal are mounted. In order to correspond to the numbers of the cartridge, the support elements 161 are in a plurality of numbers and provided in proxity of the cartridges received in the container 10. The pushbutton rods 162 to 165 are provided to each of the support elements. After the container 10 is retained at a position where the cartridge to be played is carried in the playing position by rotation of the container 10, the reciprocating deck 28 (FIG. 1) is moved in the direction of arrow B to move the cartridge to the play position so that the switch block 160 is close to the support element 161 to face thereto. The pushbutton rods 162 to 165 are frictionally engaged with the support elements 161. In FIG. 7, the pushbutton rods 162 and 163 are in depressive position by hand. When the switch block 160 with the reciprocating deck 28 (FIG. 1) is moved in the direction of arrow B to face to the support element 161, the tip end of the pushbutton rod 162 is interposed between a pair of the contacts of the track selecting switch 215 to short the contacts while the tip end of the other rod 163 shorts a pair of the contacts of the track selecting switch 216. Thus, the track selecting switches 215 and 216 are closed whereas the track selecting switches 217 and 218 are maintained open. Since the switch 215 is similar to the track selecting switch 115 and the switch 216 is similar to the track selecting switch 116 (FIG. 4), it will readily be understood that the third record track and the fourth track may be selected and thus reproduced. The record track to be reproduced by each of the cartridges stored in the container 10 is designated by operation of the pushbutton rods 162 to 164 corresponding to each of the cartridges. If all the pushbutton switches 162 to 165 corresponding to the cartridge in the playing position be depressedly operated, the cartridge does not enable any of the record tracks to be reproduced since all the track selecting switches 215 to 218 are closed. In other words, the cartridge not to be played may be designated by suitably operating the pushbutton rods 162 to 165.

Figure 8:
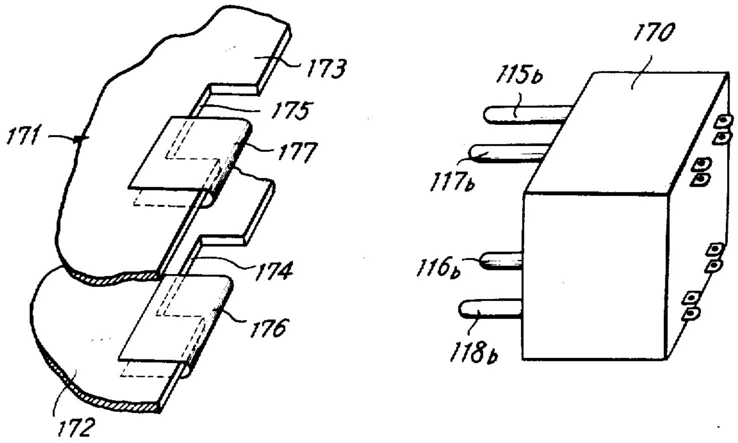
FIG. 8 is a schematic representation explanatory of still another designator means for designating the record track to be reproduced.

FIG. 8 shows alternative means for designating the record track to be reproduced, in which numeral 170 is a switch block mounted to the reciprocating deck 28 (FIG. 1). The switch block 170 contains switches similar to the track selecting switches 115 to 118 (FIG. 4) therein. The actuators $115_b$ to $118_b$ for these switches are extended outwardly of the block. The tape cartridge is shown by 171 with partially broken away to illustrate only a portion of the leading edge thereof. Notches 174, 175 are formed in a base and top plates 172, 173 at the leading edges of the cartridge, respectively. Each of the plates 172, 173 at the front edge thereof is provided with slider indicated by 176, 177, respectively. The sliders 176, 177 are of dimension sufficient to fully cover the notch 174, 175. The cartridge which is same as the cartridge 171 in its construction is arranged in the container 10 (FIG. 1). When the reciprocating deck 28 (FIG. 1) is moved toward the cartridge in the playing position in the direction of arrow B to take position for playing the cartridge, the actuators $116_b$, $118_b$ and $115_b$, $117_b$ are caused to face the notches 174, 175, respectively. As shown, the sliders 176, 177 are slided to cover the notches to the half extent, the actuators $117_b$ and $118_b$ are depressed by the respective sliders to thus close the track selecting switches 117 and 118 (FIG. 4). Accordingly, the first record track and the second track are selected and reproduced. That is, position of the sliders 174, 175 are predetermined in relation to each of the cartridges received in the container 10 to effect selection of the record track to be reproduced. On the other hand, if the sliders 176, 177 are moved to fully cover the notches 174, 175, the actuators $115_b$ to $118_b$ are all depressed to close the track selecting switches 115 to 118 so that none of the record tracks are reproduced. In other words, the cartridge not to be played can be designated by properly moving the sliders 176, 177.

While the present invention has been described in detail with respect to preferred embodiments, the present invention is not intended to be limited to the embodiments as illustrated and various changes and improvement may be made within the scope of the appended claims.

What is claimed is;

1. In a programmed track selecting apparatus for a multiple tape cartridge player utilizing a plurality of multi track endless magnetic tape cartridges, comprising a container rotatably mounted to receive a plurality of cartridges therein, a reciprocating deck carrying means for reproducing the tape including a capstan and a magnetic head, and control means for controlling rotation of the container and movement of the deck, said control means being operable in reponse to an electrical signal to intermittently rotate the container to bring the cartridges to a predetermined playing position in a successive manner and to reciprocate the deck between a position where the cartridge in the playing position is played by said reproducing means and a position where it is not, the improvement of a control means being comprised of:

a cam, an electrical plunger for intermittently rotating said cam when energized said cam being operable to shift said magnetic head to a desired track on said tape; a rotary switch rotatably operated synchronously with said cam, said rotary switch having a plurality of first switch members in number corresponding to the respective tracks on the tape and one second switch member for generating said electrical signal, said first switch members being selectively and individually closed by intermittent rotation of said cam and said second switch member being closed during the period when said cam is rotated from a first predetermined position to a second predetermined position; a plurality of track selecting switches corresponding in number to the individual tracks on the tape and connected in series with respective first switch members, a plurality of series connections between said track selecting switches and said first switch members each being connected in series with an electrical source for energizing said electrical plunger and said plunger; and designator means for designating the desired track to be reproduced on a tape in any cartridge, said designator means being disposed on a rotatable assignment plate, means for rotating said assignment plate at a rotational speed less than that of said container, said designator means being provided to correspond to the individual cartridges and having a plurality of pushbutton rods for selectively operating said track selecting switches, said track selecting switches being mounted below said assignment plate, said pushbutton rods being slidably mounted in said assignment plate for movement between an upper position and a lowered position where a portion thereof projects below said assignment plate, said track selection switches each having an actuator operable to be closed by engagement with said projecting portion of a lowered pushbutton rod when a cartridge is engaged in said playing position, said plunger being operable to be energized to rotate said cam when a said track selecting switch is closed by a said pushbutton rod, and said plunger being operable to be deenergized so as not to rotate said cam when a said track selecting switch is not closed by a said pushbutton rod whereby the track corresponding to an open track selecting switch is automatically selected and reproduced.

2. A programmed track selecting apparatus for a multiple tape cartridge player in accordance with claim 1, wherein said track selecting switches are mounted on a swingable plate, said plate being normally biased to a position where said actuator for said track selecting switches may engage the lowered pushbutton rods, said swing plate being connected to a second electrical plunger, means for energizing said second plunger by said electrical signal common to said electrical plunger for drivingly rotating said cam, said second plunger when energized being operable to swing said swing plate to a position where said actuator for said track selecting switches is released from engagement with said pushbutton rod, and said assignment plate being operable to be rotated to carry said designator means to a position for operating said track selecting means.

3. A programmed track selecting apparatus for a multiple tape cartridge player in accordance with claim 2, wherein a normally open switch is connected in parallel to said second switch member for generating said electrical signal, said normally open switch being mounted on said swing plate, each designator means corresponding to an individual cartridge having an additional pushbutton rod for operating said normally open switch slidably mounted in said assignment plate, said additional pushbutton rod being operable when depressed to close said normally open switch to produce said electrical signal thus rotating said container thereby locating the next cartridge in said playing position.

* * * * *